United States Patent
Berg et al.

(10) Patent No.: US 9,191,130 B2
(45) Date of Patent: Nov. 17, 2015

(54) MULTI-CARRIER METHOD IN A MEASUREMENT DEVICE

(75) Inventors: Miguel Berg, Upplands Väsby (SE); Antoni Fertner, Stockholm (SE); Daniel Cederholm, Sollentuna (SE); Per Ola Börjesson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/368,843

(22) PCT Filed: Jan. 5, 2012

(86) PCT No.: PCT/EP2012/050140
§ 371 (c)(1),
(2), (4) Date: Oct. 3, 2014

(87) PCT Pub. No.: WO2013/102497
PCT Pub. Date: Jul. 11, 2013

(65) Prior Publication Data
US 2015/0180596 A1  Jun. 25, 2015

(51) Int. Cl.
| H04B 3/46 | (2015.01) |
| H04B 17/00 | (2015.01) |
| H04B 17/30 | (2015.01) |
| H04L 27/26 | (2006.01) |

(52) U.S. Cl.
CPC .................. *H04B 17/30* (2015.01); *H04B 3/46* (2013.01); *H04L 27/2601* (2013.01); *H04L 27/2627* (2013.01)

(58) Field of Classification Search
CPC . H04B 17/30; H04L 27/2601; H04L 27/2627
See application file for complete search history.

(56) References Cited

U.S. PATENT DOCUMENTS

| 5,461,318 | A | 10/1995 | Borchert et al. | |
|---|---|---|---|---|
| 6,570,394 | B1 | 5/2003 | Williams | |
| 7,386,072 | B2 * | 6/2008 | Uno | 375/344 |
| 2004/0184399 | A1 * | 9/2004 | Chiou | 370/206 |
| 2006/0114816 | A1 * | 6/2006 | Maltsev et al. | 370/210 |

(Continued)

FOREIGN PATENT DOCUMENTS

WO  2006081484 A2  8/2006

OTHER PUBLICATIONS

International Search Report for PCT/EP2012/050140, mailed Oct. 16, 2012, 2 pages.

*Primary Examiner* — Erin File
(74) *Attorney, Agent, or Firm* — Withrow & Terranova, PLLC

(57) ABSTRACT

The invention relates to a multi-carrier method in a measurement device for improving reach of a measurement, said method comprising: transmitting a first signal in a sequence, measuring a response to said first signal, calculating a first transfer function for frequency of each modulated subcarrier in the first signal, transmitting a second signal of the sequence, wherein at least one subcarrier in the second signal has modulation different from that of the subcarriers in the first signal, measuring a response to said second signal, calculating a second transfer function for frequency of each modulated subcarrier in the second signal, said second transfer function comprising for each frequency a thereto associated second distortion component, calculating a mean value of all first and second transfer functions. The invention further relates to a measurement device for performing said method.

19 Claims, 3 Drawing Sheets

(56) References Cited

U.S. PATENT DOCUMENTS

| | | |
|---|---|---|
| 2006/0120442 A1 | 6/2006 | Melsa et al. |
| 2007/0147523 A1* | 6/2007 | Sakata et al. .................. 375/260 |
| 2010/0080312 A1* | 4/2010 | Moffatt et al. ................. 375/260 |
| 2011/0074506 A1* | 3/2011 | Kleider et al. ................ 330/149 |

* cited by examiner

MULTI-CARRIER METHOD IN A MEASUREMENT DEVICE

This application is a 35 U.S.C. §371 national phase filing of International Application No. PCT/EP2012/050140, filed Jan. 5, 2012, the disclosure of which is incorporated herein by reference in its entirety.

TECHNICAL FIELD

The disclosure relates to a method and a device for improving reach of a multi-carrier measurement.

BACKGROUND

It is, in telecommunications, often necessary to characterize a channel between transmitter and receiver so that its capacity can be determined and/or to troubleshoot problems.

One conventional method of characterizing said channel is to send a test signal and subsequently measure its response. If active equipment is connected to both ends of the channel, it is possible to perform transmission measurements. Reflection measurements, on the other hand, can be performed even if only one end of the channel is connected to active equipment. Regardless of the type of measurement, a transfer function is typically used to describe the relation between the test signal and its response.

The signal may be transmitted using different technologies, e.g. in time domain by sending and collecting pulsed signals (Time-Domain Transmissometry (TDT), Time-Domain Reflectometry (TDR)), or in frequency domain by using wideband, noise-like signals (Frequency-Domain Transmissometry (FDT), Frequency-Domain Reflectometry (FDR). Absence of strong harmful peaks in noise-like signals typically used in FDR/FDT is one of the reasons why FDR/FDT normally is used in above described methods of channel characterization.

A typical FDR/FDT measurement consists of the following steps:
1. Start transmission of periodic multi-carrier test signal X(f)
2. Wait until any transients have decayed sufficiently (e.g. a number of signal periods)
3. Measure reflection or transmission response Y(f) for current signal period
4. Repeat step 4 and average over $N_{avg}$ signal periods to get a mean value of Y(f)
5. Calculate normalized response (estimate of transfer function) by dividing the obtained mean value of Y(f) with X(f)

DSL (Digital Subscriber Line) is a family of technologies providing digital data transmission over wires (transmission lines) of a local network. xDSL is a generic term used to denominate any DSL-technology such as ADSL2 or VDSL2. Methods deployed in order to characterize lines carrying xDSL-traffic are frequently referred to as Double-Ended Line Test (DELT), when corresponding transmitter and receiver are connected to different ends of a transmission line (transmission measurement), and Single-Ended Line Test (SELT), when corresponding transmitter and receiver are connected to the same end of a transmission line (reflection measurement). These methods are in xDSL applications typically performed in frequency domain (FDT, FDR), since xDSL is based on frequency-domain multi-carrier modulation (Discrete Multi-Tone, DMT). Said measurements may be performed using a transceiver that is already a part of the network or a dedicated piece of hardware.

For SELT-measurements, any type of signal may in principle be used as there are no interoperability issues between transmitter and receiver since these are in the same node. Accordingly, signal type is not standardized for SELT-measurements. However, there may exist regulatory limitations (e.g. egress levels) that narrow the choice of signal somewhat.

For DELT-measurements, on the other hand, transmitter and receiver are typically located in different nodes and therefore it is necessary to standardize the signal type so that DELT measurements can be performed between nodes from different vendors.

Consequently, for both SELT and DELT, the signal used for characterizing the line needs to be chosen with care. More specifically, said signal should preferably be periodic as this simplifies averaging of the measurement, i.e. the transfer function can be calculated by frequency-domain division with the transmitted signal once averaging is completed. Further, a periodic signal means that no cyclic prefix needs to be inserted in order to avoid spectral leakage between different subcarriers in the signal. Considering all of the above, one possible type of signal is a so called REVERB-signal. Use of the REVERB-signal for line characterization purposes is also suggested in US 2006/0120442.

Results of measurements, both SELT and DELT, performed using, for instance, the REVERB signal, with purpose to characterize the channel are inevitably degraded under influence of noise. This noise may originate from the transmission line itself or it may be created in the measurement equipment. The term noise includes here all kinds of disturbances that are not dependent on the measurement signal, e.g. thermal noise, crosstalk from other signals and external noise at the receiver end.

In this context, as it is impossible to completely remove noise from a measurement system, a concept of noise floor is introduced. Accordingly, noise floor is a measure of the signal created from the sum of all the noise sources and unwanted signals within a measurement system. Noise floor limits the measurement reach since it masks weak (distant) signals.

Methods are known in the art of mitigating reach-limitations. More specifically, in the post-processing phase of a SELT-measurement, reach may be limited by the slowly decaying tail from the near-end echo that hides a weak far-end echo. Solution to this problem is proposed in U.S. Pat. No. 5,461,318.

Moreover, increased measurement time (averaging) can contribute in overcoming reach limitations caused by noise. In particular, for xDSL DELT (also known as Loop Diagnostics), the averaging time is increased compared with the same type of measurements performed during xDSL initialization. This improves somewhat precision of the measurement, e.g. the precision of the measured transfer function.

Increased output power is a simple solution to improve reach of a signal measurement. However, given regulatory aspects and output power limitations, this is not a viable way forward.

SUMMARY

During laboratory measurements, the applicants have observed that prior art methods of improving reach of a SELT-measurement, such as averaging, are not effective. Despite the fact that xDSL transceivers are designed to be extremely linear in order to support very high modulation (up to 15 bits per symbol and subcarrier), the noise floor during e.g. a SELT measurement with such a transceiver may surprisingly be dominated by non-linear distortion (e.g. intermodulation and harmonics). Such distortion may be caused by e.g. amplifier gain compression, slew-rate limitations and quantization in the transmitter and/or receiver. When the noise floor is dominated by non-linear distortion, averaging will not be able to substantially decrease the noise floor and increasing transmit power may even make things worse. A general objective of this disclosure is therefore to reduce the negative impact of non-linear distortion on the reach of the measurement. To that purpose, a multi-carrier method in a measurement device is provided.

The above stated objective is achieved by means of a method and at least one measurement device according to the independent claims, and by the embodiments according to the dependent claims.

A first aspect of exemplary embodiments provides a multi-carrier method in a measurement device for improving reach of a measurement. Hereafter, a subcarrier denotes a narrow-band signal (typically a sine or cosine) with a given frequency. The method comprises transmitting a first signal of a sequence, said first signal having at least two first modulated subcarriers associated thereto, measuring, in a measurement device, a response to said first signal and calculating a first transfer function for frequency of each subcarrier in the first signal, said first transfer function comprising for each frequency a thereto associated first distortion component. The method further comprises transmitting a second signal of the sequence, said second signal having at least two second modulated subcarriers associated thereto, wherein at least one subcarrier in the second signal has modulation different from that of the subcarriers in the first signal, measuring, either in the same or an additional measurement device, a response to said second signal and calculating a second transfer function for frequency of each subcarrier in the second signal, said second transfer function comprising for each frequency a thereto associated second distortion component, wherein an aggregate of all first and second distortion components comprises at least one distortion component having a sign that differs from the sign of the remaining distortion components constituting said aggregate. Finally, the method comprises calculating a mean value of all first and second transfer functions.

A second aspect of exemplary embodiments provides a measurement device for use in a multi-carrier measurement and arranged to improve reach of the measurement. Said measurement device comprises a transmitter configured to transmit a signal sequence comprising at least a first and a second signal, wherein at least two modulated subcarriers are associated to each signal, wherein at least one subcarrier in the second signal has modulation different from the corresponding subcarrier in the first signal, and/or a receiver configured to receive a response to said signal sequence. It further comprises a processing circuitry configured to measure signal response for each signal of the sequence and to calculate, for frequency of each subcarrier in at least the first and the second signal, the transfer function, each transfer function comprising a distortion component, wherein an aggregate of all distortion components for a given frequency comprises at least one distortion component having a sign that differs from the sign of the remaining distortion components constituting said aggregate and to calculate a mean value of all transfer functions.

An advantage of the embodiments is that they allow for reducing of the total distortion level of the measurement since destructive interference of the distortion components is achieved. By reducing distortion, total noise floor of the measurement is lowered why the reach of the measurement is automatically increased since weaker signals can be detected. The independent method claim may be implemented in a measurement device.

Further advantages and features of embodiments will become apparent when reading the following detailed description in conjunction with the drawings.

BRIEF DESCRIPTION OF THE DRAWINGS

FIG. 3b schematically illustrates the processing circuitry, as shown in FIG. 3a.

DETAILED DESCRIPTION

Figure 1A:
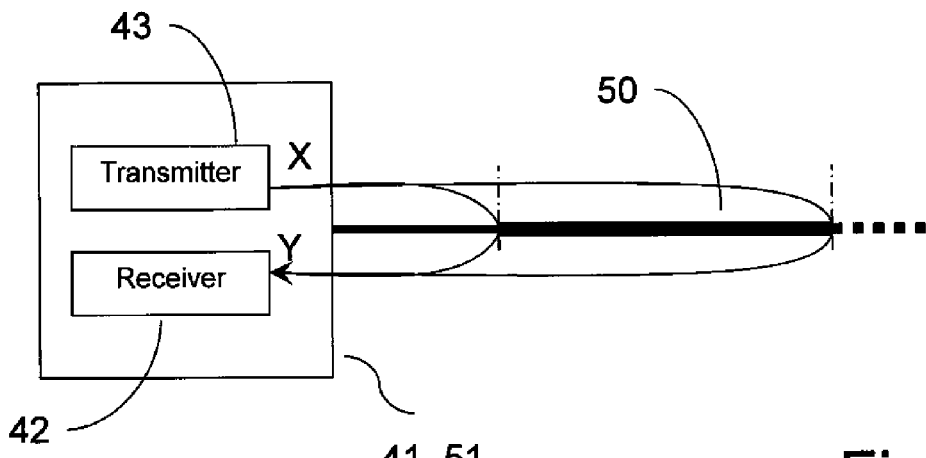
FIG. 1a is a schematic block diagram illustrating a signal response measurement in SELT-configuration belonging to the prior art.

The present invention will now be described more fully hereinafter with reference to the accompanying drawings, in which preferred embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

A basic idea of embodiments described hereinafter is to provide a signal sequence comprising at least two unique signals allowing mitigation of the limitations caused by non-linear effects (distortion) in the measurement device. Once the transfer function for every frequency of each signal has been estimated, including respective unwanted distortion component, said distortion components will add destructively when mean value of the transfer function over the sequence is calculated. Here each transfer function comprises a distortion component for each frequency and, in order to get destructive interference between the distortion components, the aggregate of all distortion components must contain components having positive as well as negative sign.

FIG. 1a is a schematic block diagram illustrating a signal response measurement in a SELT-configuration belonging to the prior art. As it may be seen, transmitting and receiving units 42, 43 of the measurement device 41 are connected to the same side of a Device Under Test (DUT) 50, which here is a transmission line with multiple segments, but other components, such as filters, are conceivable. A multi-carrier signal (X) is transmitted by the transmitting unit 43 and subsequently a response (Y) to said multi-carrier signal is received by the receiving unit 42. A transfer/echo function (H) is subsequently estimated by dividing Y with X. Obtained estimate of the transfer function (H), may then be further used to determine different properties of the DUT 50.

Figure 1B:
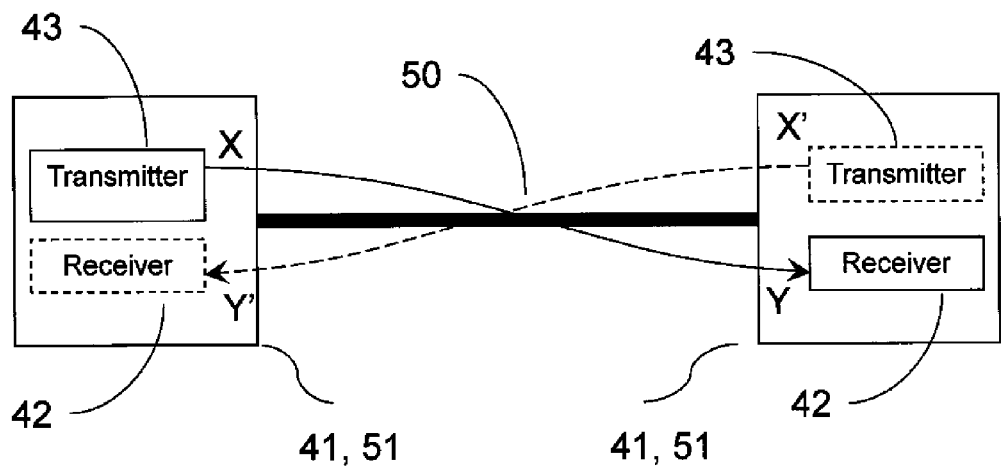
FIG. 1b is a schematic block diagram illustrating a signal response measurement in DELT-configuration that also belongs to the prior art.

FIG. 1b is a schematic block diagram illustrating a signal response measurement in DELT-configuration that also belongs to the prior art. A main difference when compared with SELT-configuration is the presence of two measurement devices 41, one at each end of a DUT 50, which here, again, is a transmission line. A multi-carrier signal (X) is transmitted by a transmitting unit 43 and subsequently a response (Y) to said multi-carrier signal is received by a receiving unit 42. Analogously to the situation in conjunction with FIG. 1a, once response has been received, a transfer function (H) is estimated, typically on the receiver end.

Figure 2:
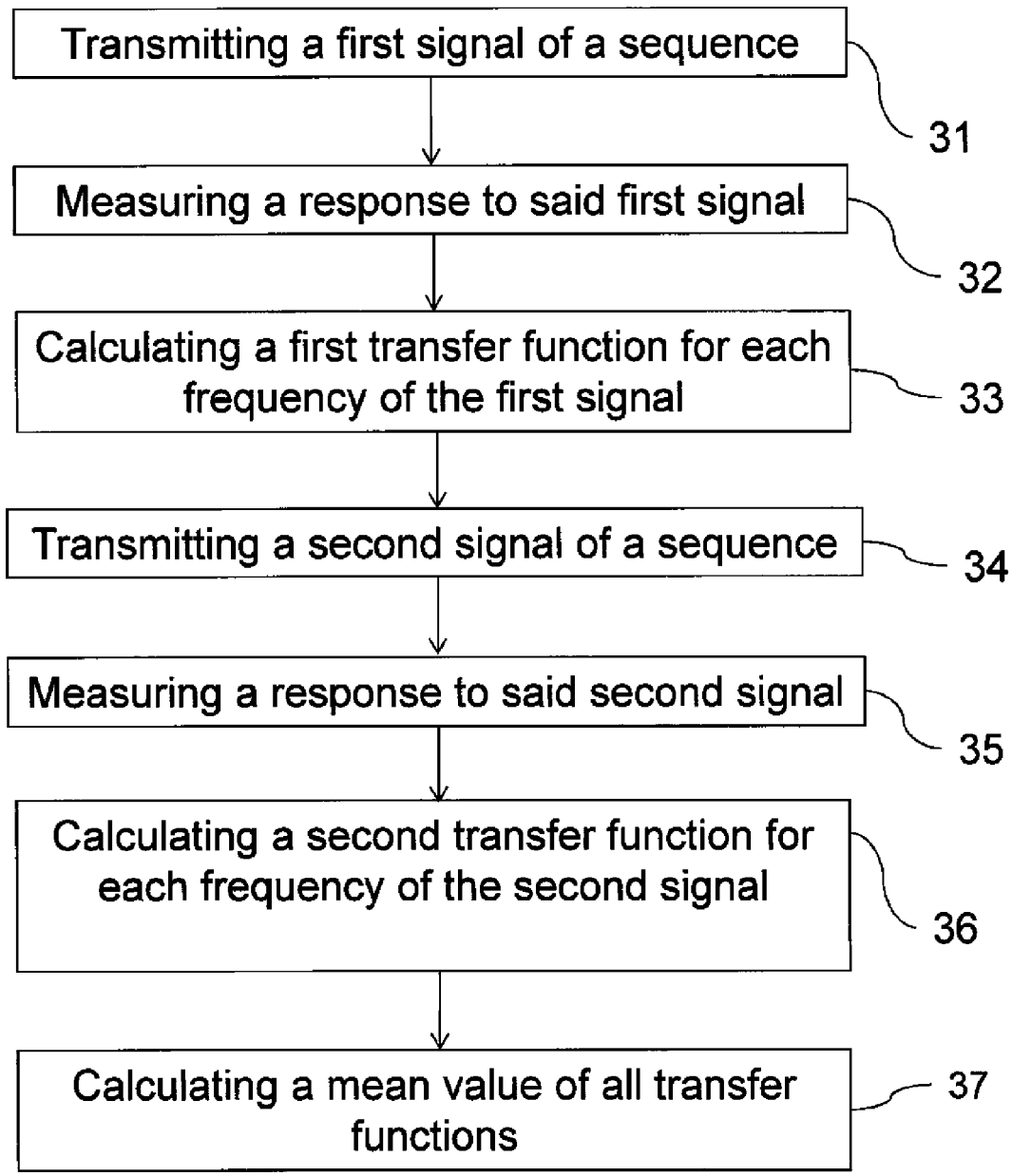
FIG. 2 is a flow diagram illustrating a multi-carrier method in a measurement device for improving reach of a measurement according to an exemplary embodiment.

In a first step of the method illustrated in the flow diagram of FIG. 2 a first signal of a sequence is transmitted 31, said first signal having at least two first modulated subcarriers associated thereto. Said multi-carrier signal is typically a sweep signal having a significant bandwidth and typically comprises at least 256 modulated subcarriers. A response to said first signal is subsequently measured 32. This measurement takes place in a measurement device. A first transfer function for frequency of each modulated subcarrier in the first signal is thereafter calculated 33 in the measurement device. Because of non-linearities in the measurement device, said first transfer function comprises, for each frequency, a thereto associated first distortion component.

A second signal of the sequence is subsequently transmitted 34. Also this second signal has at least two second modulated subcarriers associated thereto and at least one subcarrier in the second signal has modulation different from the corresponding subcarrier in the first signal. Typically, the same set of modulated subcarriers is used for both (all) signals in the sequence. Thereafter, a response to said second signal is measured 35, either in the same or in an additional measurement device, whereupon a second transfer function for frequency of each modulated subcarrier in the second signal is calculated 36. Also the second transfer function comprises for each frequency a thereto associated second distortion component. By suitably modulating subcarriers, i.e. setting parameters (phase and/or amplitude) of the respective signal of the signal sequence, difference between them is established. This difference results then in that an aggregate of all first and second distortion components comprises at least one distortion component having a sign, i.e. "+" or "−", that differs from the sign of the remaining distortion components constituting said aggregate. Finally, a mean value of all first and second transfer functions is calculated 37. Since, as explained above, at least one distortion component has a different sign than the remaining ones, the addition operation performed as part of the mean value calculation process reduces the total non-linear distortion level of the measurement since destructive interference of the distortion components is achieved. In this way, total noise floor of the measurement is lowered why reach of the measurement is increased. It has been verified through experiments that reach extensions of up to 25% are feasible. In these experiments 100 different signals have been used. Consequently, even more significant improvements of the reach are conceivable if even longer signal sequences are used.

In the following, a multi-carrier method for improving reach of a measurement by enabling destructive interference of quadratic (second order) distortion components belonging to different signals is exemplified.

In FDR and FDT, it is, as stated in conjunction with FIGS. 1a and 1b, usually desired to estimate the echo and/or transfer function. A frequency domain test signal X(f) is transmitted, and the received frequency domain signal is Y(f). A linear time-invariant measurement response can then be described as:

$$Y(f) = X(f) \cdot H(f) + N(f)$$

where H(f) is a linear echo or transfer function and N(f) is additive Gaussian noise. Dividing the received signal with the transmitted signal yields an estimate of H(f) as:

$$\hat{H}(f) = \frac{Y(f)}{X(f)} = \frac{X(f) \cdot H(f) + N(f)}{X(f)} = H(f) + \frac{N(f)}{X(f)}$$

$$= H(f) + \varepsilon$$

In the above case, increased averaging will reduce error term £ and thus also improve measurement precision. For the general case with non-linear functions in transmitter ($G_T$) and receiver ($G_R$), we have $$Y(f) = G_R(G_T(X(f)) \cdot H(f) + N(f)),$$

Now, assuming that the test signal is a real-valued multi-carrier signal with M modulated subcarriers $$X = \sum_{m=0}^{M-1} x_m = \sum_{m=0}^{M-1} a_m \cos(2\pi f_m t + \phi_m)$$

where t is time, $a_m$ corresponds to amplitude modulation and $\phi_m$ corresponds to phase modulation of the subcarrier with frequency $f_m$. Such a test signal is possible to generate by utilizing an Inverse Fast Fourier Transform (IFFT) if $f_m = m\Delta f$ where M is the subcarrier (frequency) step size.

If the above test signal is subject to a memoryless non-linearity G that can be expanded to a Taylor series, $$G(u) = \sum_{p=0}^{\infty} g_p u^p,$$

the output can be described as $$Z = \sum_{n=0}^{\infty} z^{(n)} = \sum_{n=0}^{\infty} g_n X^n = g_0 + g_1 X + g_2 X^2 + g_3 X^3 + \cdots$$

where n=1 corresponds to the desired signal, the first term ($g_0$) is a DC-bias, while the rest are undesired distortion components. Inserting X gives the individual distortion components as:

$$z^{(n)} = g_n \left( \sum_{m=0}^{M-1} x_m \right)^n$$

which can be rewritten using the multinomial theorem as:

$$z^{(n)} = g_n \sum_{|\kappa|=n} \binom{n}{\kappa} \prod_{0 \le m \le M-1} x^\kappa$$

where $\kappa = (\kappa_0, \kappa_1, \cdots, \kappa_{M-1})$ and $$x^\kappa = (x_0^{\kappa_0}, x_1^{\kappa_1}, \cdots, x_{M-1}^{\kappa_{M-1}}).$$

For the case with n=2 (quadratic non-linearity) we have:

$$z^{(n)} = g_2 \left( \sum_{m=0}^{M-1} x_m \right)^2$$

$$= g_2 \sum_{m=0}^{M-1} a_m x_m \left( a_m x_m + 2 \sum_{p=m+1}^{M-1} a_p x_p \right)$$

$$= g_2 \sum_{m=0}^{M-1} \sum_{p=0}^{M-1} a_m a_p x_m x_p$$

$$= g_2 \sum_{m=0}^{M-1} \sum_{p=0}^{M-1} a_m a_p \cos(2\pi f_m t + \phi_m) \cos(2\pi f_p t + \phi_p)$$

By use of trigonometric identities, this becomes:

$$z^{(2)} = g_2 \sum_{m=0}^{M-1} \sum_{p=0}^{M-1} \frac{a_m a_p}{2} \left( \begin{array}{l} \cos(2\pi(f_m + f_p)t + \phi_m + \phi_p) + \\ \cos(2\pi(f_m - f_p)t + \phi_m - \phi_p) \end{array} \right).$$

In order to make expressions more readable, it is assumed that $f_m = m\Delta f$ where M is the subcarrier step size, which is also a requirement if an IFFT method is used to generate the signal as stated earlier. Thus, $f_m + f_p = f_{m+p}$. By identification and substitution it is found that the quadratic distortion output at frequency $f_i$ can be written as $$z^{(2)}(f_i) = g_2 \sum_{k=0}^{i} \frac{a_{i-k} a_k}{2} \cos(2\pi f_i t + \phi_{i-k} + \phi_k) +$$

$$g_2 \sum_{k=0}^{M-1-i} \frac{a_{i+k} a_k}{2} \cos(2\pi f_i t + \phi_{i+k} - \phi_k).$$

From the above, it can be observed that signals X and −X have the same quadratic distortion, since −X corresponds to adding π to the phase modulation of each subcarrier or putting a minus sign in front of all amplitude modulation components. Since they always occur in pairs, the effect is zero phase change (integer multiple of 2π). Similar reasoning can be made for all even-order distortion terms $z^{(even)}$; the distortion is unaffected by a polarity change of the signal while the opposite is true for odd-order distortion; if the signal polarity changes, so does the polarity of the distortion (full correlation).

Thus, if averaging is performed over separate measurements with two equal-magnitude but opposite-polarity signals: $X_1$ and $X_1 = -X_2$ and, the resulting estimate becomes $$\hat{H}(f) = \frac{1}{2} \left( \frac{Y_1(f)}{X_1(f)} + \frac{Y_2(f)}{X_2(f)} \right)$$

$$= \frac{1}{2} \left( \frac{(X_1(f) + z_1^{(even)} + z_1^{(odd)}) \cdot H(f) + N_1(f)}{X_1(f)} + \frac{(X_2(f) + z_2^{(even)} + z_2^{(odd)}) \cdot H(f) + N_2(f)}{X_2(f)} \right)$$

$$= \frac{1}{2} \left( \frac{(X_1(f) + z_1^{(even)} + z_1^{(odd)}) \cdot H(f) + N_1(f)}{X_1(f)} + \frac{(-X_1(f) + z_1^{(even)} - z_1^{(odd)}) \cdot H(f) + N_2(f)}{-X_1(f)} \right)$$

$$= H(f) \left( 1 + \frac{z_1^{(odd)}}{X_1(f)} \right) + \frac{N_1(f) - N_2(f)}{X_1(f)}$$

$$= H(f) \left( 1 + \frac{z_1^{(odd)}}{X_1(f)} \right) + \varepsilon_1 - \varepsilon_2$$

where it may be seen that all even-order distortion terms are perfectly cancelled in the averaging process since $$\frac{z_2^{(even)}}{X_2(f)} = \frac{-z_1^{(even)}}{X_1(f)}$$

while the odd-order distortion is unaffected since it is perfectly correlated with the signal polarity change. These results are true for transmitter as well as receiver quadratic non-linearity.

In the following, another example of a multi-carrier method for improving reach of a measurement is presented. In this example distortion components of the third-order belonging to different signals interfere destructively and cancellation becomes more complicated. Consequently, even for measurements involving only a few subcarriers, it can be difficult or even practically impossible to design sequences that cancel distortion completely due to the large number of distortion components generated.

With the same assumptions as for the second-order distortion analysis above, the third-order distortion becomes:

$$z^{(3)} = g_3 \left( \sum_{m=0}^{M-1} x_m \right)^3$$

$$= g_3 \sum_{m=0}^{M-1} \sum_{p=0}^{M-1} \sum_{r=0}^{M-1} a_m a_p a_r x_m x_p x_r$$

$$= g_3 \sum_{m=0}^{M-1} \sum_{p=0}^{M-1} \sum_{r=0}^{M-1} a_m a_p a_r \cos(2\pi f_m t + \phi_m) \cos(2\pi f_p t + \phi_p)$$

$$\cos(2\pi f_r t + \phi_r)$$

which becomes:

$$z^{(3)} = g_3 \sum_{m=0}^{M-1} \sum_{p=0}^{M-1} \sum_{r=0}^{M-1} \frac{a_m a_p a_r}{2} \left( \begin{array}{l} \cos(2\pi f_{m+p} t + \phi_m + \phi_p) + \\ \cos(2\pi f_{m-p} t + \phi_m - \phi_p) \end{array} \right)$$

$$\cos(2\pi f_r t + \phi_r)$$

$$= g_3 \sum_{m=0}^{M-1} \sum_{p=0}^{M-1} \sum_{r=0}^{M-1} \frac{a_m a_p a_r}{4} \left( \begin{array}{l} \cos(2\pi f_{m+p+r} t + \phi_m + \phi_p + \phi_r) + \\ \cos(2\pi f_{m-p+r} t + \phi_m - \phi_p + \phi_r) + \\ \cos(2\pi f_{m+p-r} t + \phi_m + \phi_p - \phi_r) + \\ \cos(2\pi f_{m-p-r} t + \phi_m - \phi_p - \phi_r) \end{array} \right)$$

Thus, the distortion output at frequency $f_i$ can be written as $$z^{(3)}(f_i) = g_3 \sum_{k=0}^{M-1} \begin{pmatrix} \sum_{l=0}^{i-k} \frac{a_{i-k-l}a_k a_l}{4}\cos(2\pi f_i t + \phi_{i-k-l} + \phi_k + \phi_l) + \\ \sum_{l=0}^{M-1-i+k} \frac{a_{i-k+l}a_k a_l}{4}\cos(2\pi f_i t + \phi_{i-k+l} + \phi_k - \phi_l) + \\ \sum_{l=0}^{i-k} \frac{a_{i-k-l}a_k a_l}{4}\cos(2\pi f_i t + \phi_{i+k-l} - \phi_k + \phi_l) + \\ \sum_{l=0}^{M-1-i-k} \frac{a_{i+k+l}a_k a_l}{4}\cos(2\pi f_i t + \phi_{i+k+l} - \phi_k - \phi_l) \end{pmatrix}$$

Using the same method as for even order distortion but now with $X_2(f) = c^{(3)}X_1(f)$ yields $$\hat{H}(f) = \frac{1}{2}\left(\frac{Y_1(f)}{X_1(f)} + \frac{Y_2(f)}{X_2(f)}\right)$$

$$= \frac{1}{2}\begin{pmatrix} \frac{(X_1(f) + z^{(3)}) \cdot H(f) + N_1(f)}{X_1(f)} + \\ \frac{(cX_1(f) + (c^{(3)})^3 z^{(3)}) \cdot H(f) + N_2(f)}{c^{(3)}X_1(f)} \end{pmatrix}$$

$$= H(f)\left(1 + \frac{z^{(3)} + (c^{(3)})^2 z^{(3)}}{X_1(f)}\right) + \frac{N_1(f) - N_2(f)}{X_1(f)}$$

$$= H(f)\left(1 + \frac{z^{(3)}(1 + (c^{(3)})^2)}{X_1(f)}\right) + \varepsilon_1 - \varepsilon_2$$

From the above expression, it seems possible that also the third order distortion could be cancelled completely by averaging over a sequence containing two different signals, in the same way as for the even order distortion, but by using a scale factor $c_3$ for all tones such that $$1 + (c^{(3)})^2 = 0,$$

which is satisfied by e.g. $c^{(3)} = \sqrt{-1}$. The method can be generalized to any order of distortion, n, using the equation $$1 + (c^{(n)})^{n-1} = 0$$

As previously stated, for all even-order distortion terms, $c^{(n)} = -1$ is a solution to this equation but for odd-order distortion, the equation does not have any real solutions. For distortion with order n, the general solution is $$c^{(n)} = e^{j\left(\frac{\pi}{n-1} + q\frac{2\pi}{n-1}\right)},$$

$q \in Z$ (set of integers).

The measurement signal needs to be real, which means that any scale values must also be real. Thus, the phase needs to be changed instead (can be achieved e.g. by taking the real part after multiplying with a complex scalar). Examination of the cosine components in $z^{(3)}(f_i)$ shows that if a phase shift corresponding to the solution for $c^{(3)}$, e.g.

$$\frac{\pi}{2},$$

is used, i.e.

$$X_2(f) = \text{Re}\left[X_1(f) \cdot e^{j\frac{\pi}{2}}\right],$$

the first cosine component of $z_2^{(3)}$ will get a phase shift of $$3\frac{\pi}{2} = -\frac{\pi}{2},$$

the second and third components will have phase shifts of $$\frac{\pi}{2},$$

and the fourth will have a phase shift of $$-\frac{\pi}{2}.$$

Thus, in the averaging process (after normalization by the test signal) the first and last cosine component both get a phase change of $\pi$ compared with the respective component in the unmodified test signal while the second and third component get the same phase (no change) as the respective component in the unmodified test signal. This means that the first and last components of $z^{(3)}(f_i)$ can be completely cancelled by the method while the second and third components are not affected.

For higher order odd distortion, results will be similar; some of the components can be cancelled completely by proper change of the phase in the test signal. Multiple distortion terms requiring different phase change can be cancelled if several different distortion terms are combined hierarchically.

Now, if it is desired to combine the effects of the above examples and cancel for example all second (actually all even) order (quadratic) and part of the third order distortion, the needed phase shifts on the signal are $\phi^{(2)} = \pi$, and $$\varphi^{(3)} = \frac{\pi}{2}.$$

The corresponding phase change sequences are then:

$$S_2 = \lfloor \theta^{(2)} \theta^{(2)} + \phi^{(2)} \rfloor$$

$$S_3 = \lfloor \theta^{(3)} \theta^{(3)} + \phi^{(3)} \rfloor$$

where the $\theta_n$ are arbitrary phase offsets that do not affect the performance. Now, the combined phase change sequence can be constructed as:

$$S_{2,3} = [[\theta^{(2)} \ \theta^{(2)} + \varphi^{(2)}] + \theta^{(3)} \ [\theta^{(2)} \ \theta^{(2)} + \varphi^{(2)}] + \theta^{(3)} + \varphi^{(2)}]$$

$$= \theta^{(2)} + \theta^{(3)} + [0 \ \varphi^{(2)} \ \varphi^{(3)} \ \varphi^{(2)} + \varphi^{(3)}]$$

If the arbitrary phase offset $\theta^{(2)} + \theta^{(3)}$ is set to zero, the result is $$S_{2,3} = \lfloor 0 \phi^{(2)} \phi^{(3)} \phi^{(2)} + \phi^{(3)} \rfloor$$

where it should be noted that the order between the $\phi^{(n)}$ values do not matter—a sequence with the same distortion mitigation performance is achieved by interchanging $\phi^{(2)}$ and $\phi^{(3)}$.

The method is easy to generalize to more than two sequences. If scalar multipliers are used instead of phase changes, the resulting scalar multiplier sequence can also be generated by a Kronecker tensor product.

As was seen above, if distortion components are to be cancelled, a deterministic signal sequence should be designed. This sequence is preferably designed to comprise a signal pair where the parts of the distortion that should be cancelled have equal amplitude but opposite sign in the echo/transfer function estimate. It was shown above that such deterministic sequences can cancel some orders of distortion completely while other remain unaffected. Since not even all of the third order distortion can be cancelled and since the low-order distortion typically dominates, there is usually no point in trying to combine many signals in the sequence in order to cancel parts of higher order distortion components. Also, the length of the sequence is the product of the length of the individual signals meaning that the measurement time will increase exponentially.

Since distortion at each frequency depends on the signal modulation at all frequencies, further reduction of distortion is possible through individual modulation changes for different frequencies. In this context, while it is possible that amplitude changes may reduce the distortion somewhat, substantial distortion reduction requires phase changes since the latter can make the phase of the distortion components more random, thus reducing correlation with the signal at any given frequency. If correlation is low, averaging will be effective to reduce distortion. Theoretically, it would be possible to use brute-force or Monte Carlo methods to find sequences with good distortion reduction properties. However, in practice, this may be too time consuming and the sequences found may require large amounts of memory for storage. Therefore, it is preferred to use carefully designed sequences that can be stored in a compact format or derived from a simple expression that does not require large storage.

As shown above, it is essential that the second signal has a different subcarrier modulation (opposite polarity in the above case dealing with quadratic distortion) from that of the first signal of the sequence. This can be achieved in several ways. One way is to consider the entire signal. Accordingly, in one exemplary embodiment the subcarrier modulation of the first and the second signals are mutually orthogonal. This is preferably achieved by means of an orthogonal code with a very compact representation such as Walsh-Hadamard code. As an example of using such codes, each subcarrier would be multiplied by either −1 or +1 (phase change of π or 0) and the multiplier would change over time within the sequence according to the values in the Hadamard matrix. Here, the rows of the Hadamard matrix could correspond to the subcarriers and the columns could correspond to different signals in the sequence or vice versa. Hadamard matrices have the property that each row is orthogonal to all other rows and each column is orthogonal to each other column. In this way, the subcarrier modulation for each frequency (as seen over the whole sequence) will be orthogonal to the subcarrier modulation at other frequencies. Also, the subcarrier modulation for each will become orthogonal to the subcarrier modulation of the other signals. In order to design orthogonal sequences with N frequency signals, a sequence length of N signals is needed (N×N Hadamard matrix). If a shorter sequence is used, some frequency components will still have full correlation.

In another embodiment, amplitude and/or phase modulation for a majority of subcarriers in at least one signal in the sequence is/are randomly or pseudo-randomly generated. By way of example, a new random number is drawn to change the phase modulation value for each frequency and for each signal within the sequence. A further example is to generate a large number of such random sequences and select thereafter the one that gives the largest reduction of distortion. With pseudorandom sequences, it is possible to create different signals by using different, possibly overlapping, sections of a long pseudorandom code to change the phase modulation. With random or pseudorandom sequences of length M, the correlation is approximately 1/M, which means that averaging over a sequence of 10 different random signals should improve reach by at least 10%.

In a further embodiment the subcarrier modulation of the first signal is uncorrelated with the subcarrier modulation of the second signal, i.e. their covariance is zero. Significant distortion cancellation is hereby achieved. Dependency of the distortion cancellation on the covariance of the subcarrier modulation of the respective signal is shown in the following: If the transfer function and noise are omitted, averaging over a sequence of M signals can be described as $$\frac{1}{M}\sum_{m=1}^{M}\frac{X_m(f)+Z_m(f)}{X_m(f)}=1+\frac{1}{M}\sum_{m=1}^{M}\frac{Z_m(f)}{X_m(f)}.$$

It is usually desired that the distortion components are decreased as far as possible, i.e. that $$\left|\frac{1}{M}\sum_{m=1}^{M}\frac{Z_m(f)}{X_m(f)}\right|\ll 1$$

At any frequency of interest, the correlation between signal and distortion over a sequence of M signals may be written as (Pearson's correlation coefficient)

$$\rho(f)=\frac{\mathrm{cov}(X(f),Z(f))}{\sigma_{Z(f)}\sigma_{X(f)}}$$

where cov( ) is the covariance, σ is standard deviation, $$X(f)=\{X_1(f),X_2(f),\ldots,X_M(f)\}$$

and $$Z(f)=\{Z_1(f),Z_2(f),\ldots,Z_M(f)\}.$$

If only a specific distortion order, n, is of interest, the correlation becomes $$\rho^{(n)}(f)=\frac{\mathrm{cov}(X(f),z^{(n)}(f))}{\sigma_{z^{(n)}(f)}\sigma_{X(f)}} \text{ and}$$

$$z^{(n)}(f)=\{z_1^{(n)}(f),z_2^{(n)}(f),\ldots,z_M^{(n)}(f)\}.$$

For any value of linear correlation (between −1 and 1), the distortion can typically be modelled as one part with full correlation, Z'(f), and one part, Z"(f) with zero correlation to the signal.

$$Z(f)=Z'(f)+Z''(f)=\rho(f)\frac{\sigma_{Z(f)}}{\sigma_{X(f)}}X(f)+Z''(f).$$

Inserting the above into the averaging process gives the remaining distortion:

$$\frac{1}{M}\sum_{m=1}^{M}\frac{Z_m(f)}{X_m(f)} = \frac{1}{M}\sum_{m=1}^{M}\frac{\rho(f)\frac{\sigma_{Z(f)}}{\sigma_{X(f)}}X_m(f) + Z''_m(f)}{X_m(f)}$$

$$= \rho(f)\frac{\sigma_{Z(f)}}{\sigma_{X(f)}} + \frac{1}{M}\sum_{m=1}^{M}\frac{Z''_m(f)}{X_m(f)}$$

where it is seen on the last line that the first term does not depend on the number of measurements, M, and thus cannot be decreased by averaging, while the second term (the sum) can be treated as noise and may even become zero if the signal sequence is designed properly.

As opposed to considering an entire signal when trying to reduce distortion and improve reach of the measurement, objective of the disclosure may also be achieved by suitably shifting only one parameter of the signal. Preferably, each subcarrier in the second signal is then phase-shifted 180° (i.e. π radians) relative to the corresponding subcarrier in the first signal. By doing this, as shown above, all even-order distortion terms are perfectly cancelled in the subsequent process of averaging transfer functions while the odd-order distortion is unaffected since it is perfectly correlated with the signal polarity change. In the same context, a phase-shift of ±90° (i.e. ±π/2 radians), also shown above, of each subcarrier in the second signal relative the first signal is directed at third order of distortion. Said phase-shift achieves removal of approximately half of the distortion components of the third order and also a part of some higher (odd) order distortion components.

Furthermore, different subcarriers may have different amplitude ratios combined with different phase shifts relative to the corresponding subcarrier in the first signal. Also, the phase modulation for a majority of subcarriers in a signal may be set to a constant (e.g. 0 or 180°) and said constant may be different for different signals in the sequence. Hereby, pulsed TDR/TDT signals in time domain are generated.

Conclusively, methods disclosed in this specification offer great flexibility and freedom in designing the individual signals of the signal sequence and with the ultimate purpose of extending the reach of the measurement.

Figure 3A:
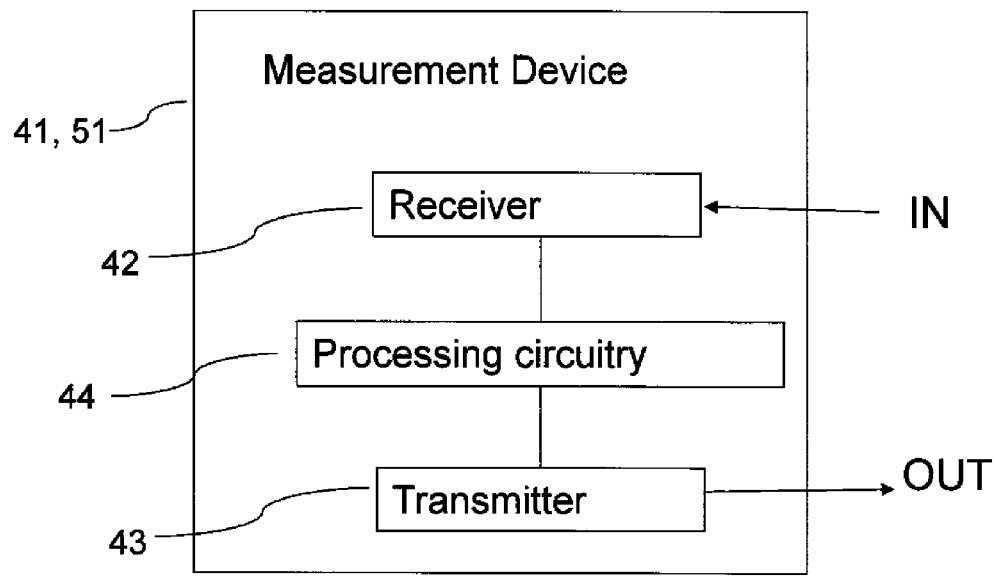
FIG. 3a schematically illustrates a measurement device according to an exemplary embodiment.

The schematically illustrated exemplary measurement device 41 of FIG. 3a is to be used to implement an exemplary method in a multi-carrier measurement as explained above. More specifically, the device 41 is to be used in, for instance, a SELT-measurement or in a DELT-measurement. Here, the measurement device 41 could e.g. be a standalone device (dedicated measurement instrument) comprising transmitting and/or receiving unit or it could be part of any type of a transceiver unit.

The measurement device 41 is connectable at least to a first end of a DUT (not shown). The measurement device 41 is further provided with suitable communication circuitry, comprising a receiver 42 and a transmitter 43 for communicating with the DUT, wherein the transmitter 43 is arranged to transmit a signal sequence to the DUT and the receiver 42 is configured to receive a response to signal sequence from the DUT. More specifically, the measurement device 41 comprises a transmitter 43 configured to transmit a signal sequence comprising at least two signals and a receiver 42 configured to receive a response to said signal sequence.

The measurement device 41 is further provided with appropriate processing circuitry 44 connected to the receiver 42 and the transmitter 43, the processing circuitry 44 being configured to handle various data originating from signal sequence. Accordingly, processing circuitry 44 is configured to generate said signal sequence in various ways, e.g. on the fly. Alternatively, said signal sequence is externally generated and received via an interface. Said processing circuitry 44 is further configured to store said signal sequence.

As stated above, in conjunction with FIG. 2, great flexibility and freedom in designing the individual signals of the signal sequence is offered. Accordingly, in one exemplary embodiment the subcarrier modulation of said first signal is uncorrelated with the subcarrier modulation of said second signal, i.e. their covariance is zero. In another embodiment, amplitude and/or phase modulation for a majority of subcarriers in at least one signal in the sequence is/are randomly or pseudo-randomly generated. In this way, at least one signal parameter value is randomly set, why significant distortion reduction is obtained and ultimately, the reach of the measurement is extended. Alternatively, the subcarrier modulation of said first and second signals are mutually orthogonal.

Figure 3B:
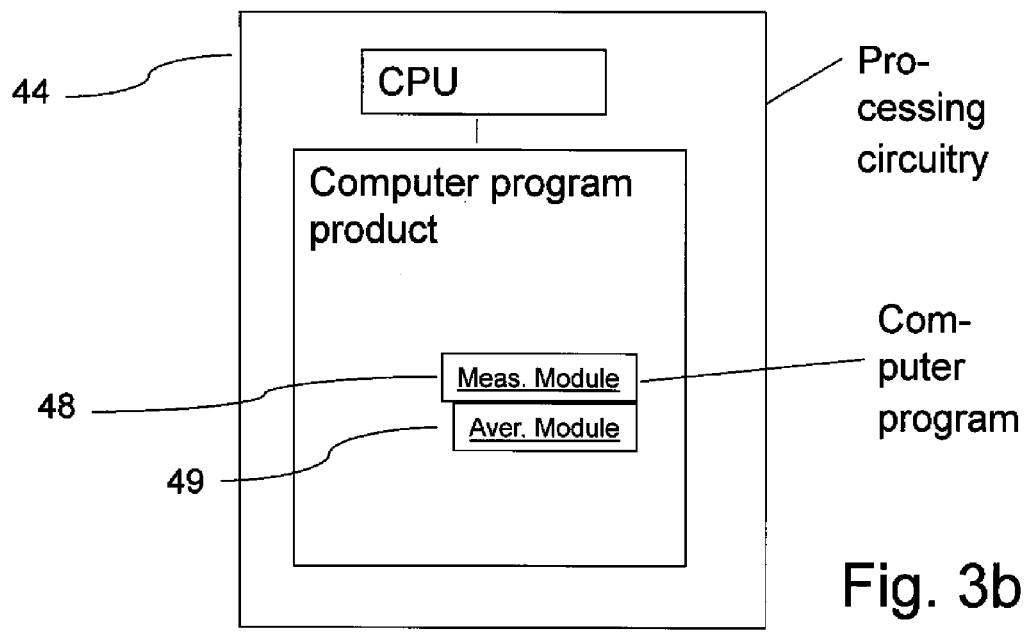

The schematically illustrated processing circuitry 44 of FIG. 3b comprises a CPU, which may be a single unit or a plurality of units. Furthermore, the processing circuitry 44 comprises at least one computer program product, in the form of a non-volatile memory, e.g. an EEPROM (Electrically Erasable Programmable Read-Only Memory), a flash memory or a disk drive. The computer program product comprises a computer program comprising computer program modules which, when run on the measurement device, cause the CPU to perform the steps executed in conjunction with FIG. 2.

Hence, in the exemplary embodiment illustrated in FIG. 3b, the code means in the computer program comprises a measurement module 48 and an averaging module 49. The modules 48, 49 essentially perform the steps of the flow in FIG. 2 to emulate the measurement device described in connection with FIG. 3a. However, one or more of the modules of the code means may in alternative embodiments be implemented partly as hardware circuits.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A multi-carrier method in a measurement device for improving reach of a measurement, said method comprising:
   transmitting a first signal in a sequence, said first signal having at least two first modulated subcarriers associated thereto,
   measuring a response to said first signal,
   calculating a first transfer function for frequency of each modulated subcarrier in the first signal, said first transfer function comprising for each frequency a thereto associated first distortion component,
   transmitting a second signal of the sequence, said second signal having at least two second modulated subcarriers associated thereto, wherein a subcarrier modulation of at least one subcarrier in the second signal is different from a subcarrier modulation of the corresponding subcarrier in the first signal,
   measuring a response to said second signal,
   calculating a second transfer function for frequency of each modulated subcarrier in the second signal, said second transfer function comprising for each frequency a thereto associated second distortion component,
   wherein an aggregate of all first and second distortion components comprises at least one distortion component having a sign that differs from the sign of the remaining distortion components constituting said aggregate, calculating a mean value of all first and second transfer functions.

2. A method according to claim 1, wherein the subcarrier modulation of the first signal is uncorrelated with the subcarrier modulation of the second signal.

3. A method according to claim 1, wherein amplitude and/or phase modulation for a majority of subcarriers in at least one signal in the sequence is/are randomly or pseudo-randomly generated.

4. A method according to claim 1, wherein the subcarrier modulation of the first and the second signals are mutually orthogonal.

5. A method according to claim 1, wherein each subcarrier in the second signal is phase-shifted 180° relative to the corresponding subcarrier in the first signal.

6. A method according to claim 1, wherein each subcarrier in the second signal is phase-shifted ±90° relative to the corresponding subcarrier in the first signal.

7. A method according to claim 1, wherein, for at least one of the signals in the sequence, different subcarriers have different amplitude ratios and/or different phase shifts relative to the corresponding subcarriers in the first signal.

8. A method according to claim 1, wherein the phase modulation for a majority of subcarriers in a signal is set to a constant and where said constant may be different for different signals in the sequence.

9. A method according to claim 1, wherein said method is implemented in a SELT (Single-Ended Line Test)-measurement.

10. A method according to claim 1, wherein said method is implemented in a DELT (Double-Ended Line Test)-measurement.

11. A measurement device for use in a multi-carrier measurement and arranged to improve reach of the measurement, said measurement device comprises:

a transmitter configured to transmit a signal sequence comprising at least a first and a second signal, wherein at least two modulated subcarriers are associated to each signal, wherein a subcarrier modulation of at least one subcarrier in the second signal is different from a subcarrier modulation of the corresponding subcarrier in the first signal, and/or a receiver configured to receive a response to said signal sequence, a processing circuitry configured to measure signal response for each signal of the sequence, calculate, for frequency of each modulated subcarrier in at least the first and the second signal, the transfer function, each transfer function comprising a distortion component, wherein an aggregate of all distortion components comprises at least one distortion component having a sign that differs from the sign of the remaining distortion components constituting said aggregate, calculate a mean value of all transfer functions.

12. A measurement device according to claim 11, for use in a SELT (Single-Ended Line Test)-measurement or in a DELT (Double-Ended Line Test)-measurement.

13. A measurement device according to claim 11, wherein said processing circuitry further is configured to generate said signal sequence.

14. A measurement device according to claim 13, wherein said processing circuitry is configured to generate said signal sequence on the fly.

15. A measurement device according to claim 11, wherein said signal sequence is externally generated and received via an interface.

16. A measurement device according to claim 11, wherein said processing circuitry further is configured to store said signal sequence.

17. A measurement device according to claim 11, wherein the subcarrier modulation of said first signal is uncorrelated with the subcarrier modulation of said second signal.

18. A measurement device according to claim 11, wherein amplitude and/or phase modulation for a majority of subcarriers in at least one signal in the sequence is/are randomly or pseudo-randomly generated.

19. A measurement device according to claim 11, wherein the subcarrier modulation of said first and second signals are mutually orthogonal.

* * * * *